United States Patent [19]

Snow et al.

[11] Patent Number: 4,683,528

[45] Date of Patent: Jul. 28, 1987

[54] PULSE POSITION MODULATED REGULATION FOR POWER SUPPLIES

[75] Inventors: Dane R. Snow, Santa Clara; David Bingham, San Jose, both of Calif.

[73] Assignee: Intersil, Inc., Cupertino, Calif.

[21] Appl. No.: 757,808

[22] Filed: Jul. 22, 1985

[51] Int. Cl.⁴ .................................. H02M 3/335;
[52] U.S. Cl. .................................. 363/21; 363/97
[58] Field of Search ................... 363/21, 25, 26, 97, 363/131, 134

[56] References Cited

U.S. PATENT DOCUMENTS

| | | | |
|---|---|---|---|
| 3,879,647 | 4/1975 | Hamilton et al. | 363/16 |
| 3,924,172 | 12/1975 | Gregorich | 363/21 |
| 3,935,526 | 1/1976 | Kamata et al. | 363/21 |
| 4,063,307 | 12/1977 | Stephens | 363/21 |
| 4,223,378 | 9/1980 | Koizumi | 363/26 |
| 4,276,587 | 6/1981 | Koizumi | 363/26 |
| 4,293,902 | 10/1981 | White | 363/26 |
| 4,323,961 | 4/1982 | Josephson | 363/21 |
| 4,347,559 | 8/1982 | Sturgeon | 363/21 |
| 4,357,654 | 11/1982 | Ikenoue et al. | 363/21 |
| 4,389,702 | 6/1983 | Clemente et al. | 363/21 |
| 4,422,139 | 12/1983 | Burkhead | 363/21 |
| 4,439,821 | 3/1984 | Grippe | 363/26 |
| 4,453,206 | 6/1984 | Voight | 363/97 |
| 4,460,951 | 7/1984 | Fenter et al. | 363/21 |
| 4,561,046 | 12/1985 | Kuster | 363/21 |
| 4,562,522 | 12/1985 | Adams et al. | 363/21 |
| 4,608,625 | 9/1986 | Josephson | 363/21 |

Primary Examiner—Patrick R. Salce
Assistant Examiner—Jeffrey Sterrett
Attorney, Agent, or Firm—S. C. Corwin; B. E. Morris

[57] ABSTRACT

A power supply regulator in which a control pulse is generated at a position in time which varies in accordance with the voltage or current supplied by the power supply. The control pulse can be fed back across an isolation boundary with a simple device such as a pulse transformer with little or no loss of accuracy. Such a control signal is particularly adaptable to varying the duty cycles of transistor switch drive signals for switched-mode power supplies.

2 Claims, 5 Drawing Figures

PULSE POSITION MODULATED REGULATION FOR POWER SUPPLIES

BACKGROUND OF THE INVENTION

1. Field of the Invention

The present invention relates to power supplies, and more particularly, to regulators for power supplies.

2. Discussion of the Background of the Invention

Many applications require power to be supplied at a particular voltage or current level. One type of power supply circuit converts the power which is available to power at the desired voltage (or current) level. However, the power input into the power supply is often unregulated so that the voltage or current of the input power may vary. Also, the load conditions on the power supply may also vary. Both of these conditions can affect the output voltage (or current) of the power supply.

To maintain the output of the power supply at a predefined level, many such power supplies have a regulator which monitors the output of the power supply and modifies the input of power to the supply as necessary. However, for switched-mode power supplies having a transformer, it is often necessary to maintain isolation between the input and output circuits of the transformer, which has complicated the design of the power supply regulators. In these power supplies, power is input into the primary coil of the transformer through a transistor switch. The output of the power supply from the secondary coil of the transformer is monitored and this information is fed back to control the transistor switch on the primary coil side of the transformer. In order to maintain isolation between the primary and secondary coils, an opto-isolator has been used to transmit the feedback information from the secondary coil side of the transformer to the switch on the primary coil side. However, these opto-isolators often have poor linearity, particularly with variations in temperature.

Another approach has been to amplitude modulate a high frequency carrier signal with the desired feedback information to couple this composite signal through a transformer. An example of such a modulator circuit is the Unitrode integrated circuit (UC 1901). However, this latter approach has often required in addition to a complex integrated circuit, several components to demodulate the amplitude modulated carrier signal.

SUMMARY OF THE INVENTION

It is an object of the present invention to provide an improved regulator for power supplies, which is both accurate and relatively uncomplicated in design.

It is a further object of the present invention to provide an accurate regulator for a switched-mode power supply in which both the number of components and the manufacturing costs are reduced.

These and other objects and advantages are achieved by a power supply in which feedback information is transmitted in the form of a position modulated pulse. In the illustrated embodiment, a pulse is generated at a time position which is a function of the deviation of the power supply output voltage. This pulse can be transmitted across the isolation boundary between the primary and secondary coils by simple devices with little or no loss of fidelity. For example, a pulse transformer can be used to transmit the pulse from the secondary coil side of the transformer to the primary coil side.

In the illustrated embodiment, the power through the primary coil is controlled by varying the duty cycle of the drive signal for a transistor switch. An additional advantage of the pulse position modulation approach of the present invention is that the feedback pulse can be used to directly control the duty cycle of the switch drive signal. The above technique maintains the high linearity often necessary for accurate regulation while reducing the complexity of the regulator circuit.

DETAILED DESCRIPTION OF THE DRAWINGS

Figure 1:
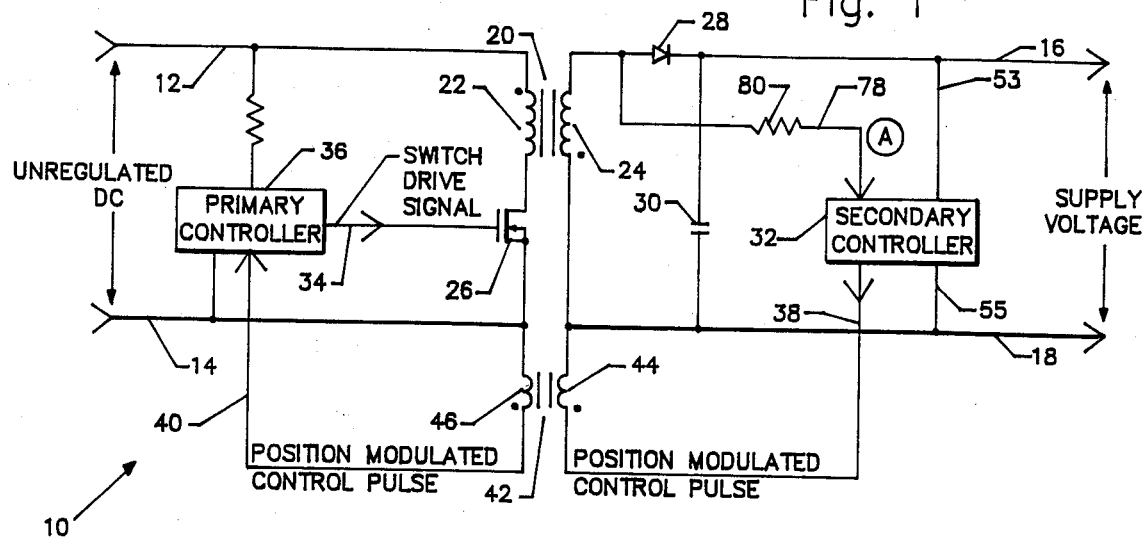
FIG. 1 is a schematic diagram of a power supply system in accordance with a preferred embodiment of the present invention.

Referring first to FIG. 1, a power supply system in accordance with a preferred embodiment of the present invention is indicated generally at 10. The system 10 has a pair of input terminals 12 and 14 at which unregulated power is applied to the system. In the illustrated embodiment, this unregulated power is the form of direct current (DC) and is converted to highly regulated power provided at output terminals 16 and 18 of the system 10. In the example of FIG. 1, the voltage of the output power at terminals 16 and 18 is closely regulated to a predetermined value. Other applications may require regulation of the power supply output current and it is recognized that the present invention is also applicable to such power supplies.

The power supply system 10 of the illustrated embodiment is of the switched-mode type and includes a transformer 20 which has a primary coil 22 and a secondary coil 24. A transistor switch 26 controls the flow of unregulated current through the primary coil 22 from the system input terminals 12 and 14. Current induced in the secondary coil 24 flows through a diode 28 to a storage capacitor 30 coupled between the system output terminals 16 and 18. In accordance with the present invention, a secondary controller circuit 32 monitors the supply voltage at the system output terminals 16 and 18 and generates a position modulated control pulse which is used to control the transistor switch 26 of the primary coil circuit. As will be more fully explained below, the position of the control pulse from the secondary controller 32, represents the deviation of the supply voltage from a predetermined desired value.

The conduction states of the transistor switch 26 are controlled by a switch drive signal from an output 34 of a primary controller circuit 36. The primary controller circuit 36 varies the duty cycle of the switch drive signal to the transistor switch 26 in accordance with the position of the position modulated control pulse from the secondary controller circuit 32.

In order to maintain isolation between the primary and secondary coils 22 and 24, the output 38 of the secondary controller 32 for the position modulated control pulse is not connected directly to the input 40 of the primary controller 36. Instead, the output of the secondary controller circuit 32 is coupled by a pulse transformer 42 to the input of the primary controller circuit 36. The pulse transformer 42 has an input coil 44 connected to the output 38 of the secondary controller 32 and an output coil 46 connected to the input 40 of the primary controller 36. It has been found that the pulse transformer 42 accurately transmits the position modulated control pulse across the isolation boundary of the transformer 20 while maintaining the isolation of the primary and secondary coils 22 and 24, respectively.

As previously mentioned, the secondary controller circuit 32 monitors the supply voltage across the output terminals 16 and 18 of the system 10, and generates a position modulated control pulse on the output 38. The position in time of this control pulse varies with the deviation of the supply voltage from the desired value.

Figure 2:
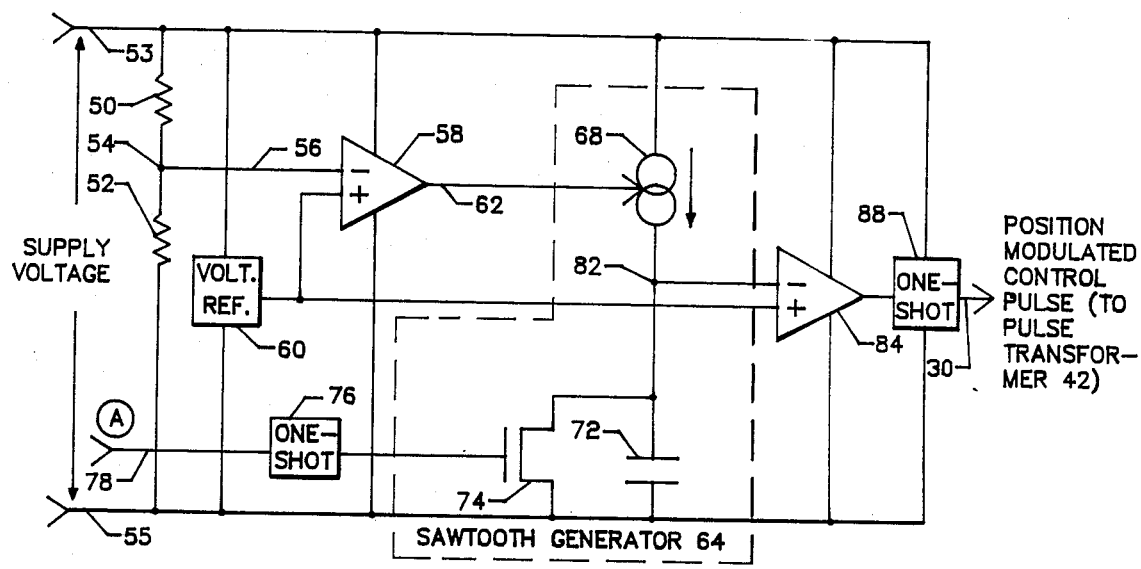
FIG. 2 is a schematic diagram of the secondary controller circuit of the system of FIG. 1.

An example of the secondary controller circuit 32 is shown in FIG. 2 to include a resistor divider comprising resistors 50 and 52 serially connected between the system output terminals 16 and 18 by a pair of conductors 53 and 55. A node 54 between the resistors 50 and 52 provides a supply voltage sampling node for one input 56 of an error amplifier 58. The error amplifier 58 compares a fraction of the system output supply voltage to a reference voltage provided by a voltage reference circuit 60, and provides an error signal at an output 62, which is proportional to the deviation of the fractional voltage at node 54 relative to the reference voltage.

Figure 4A:
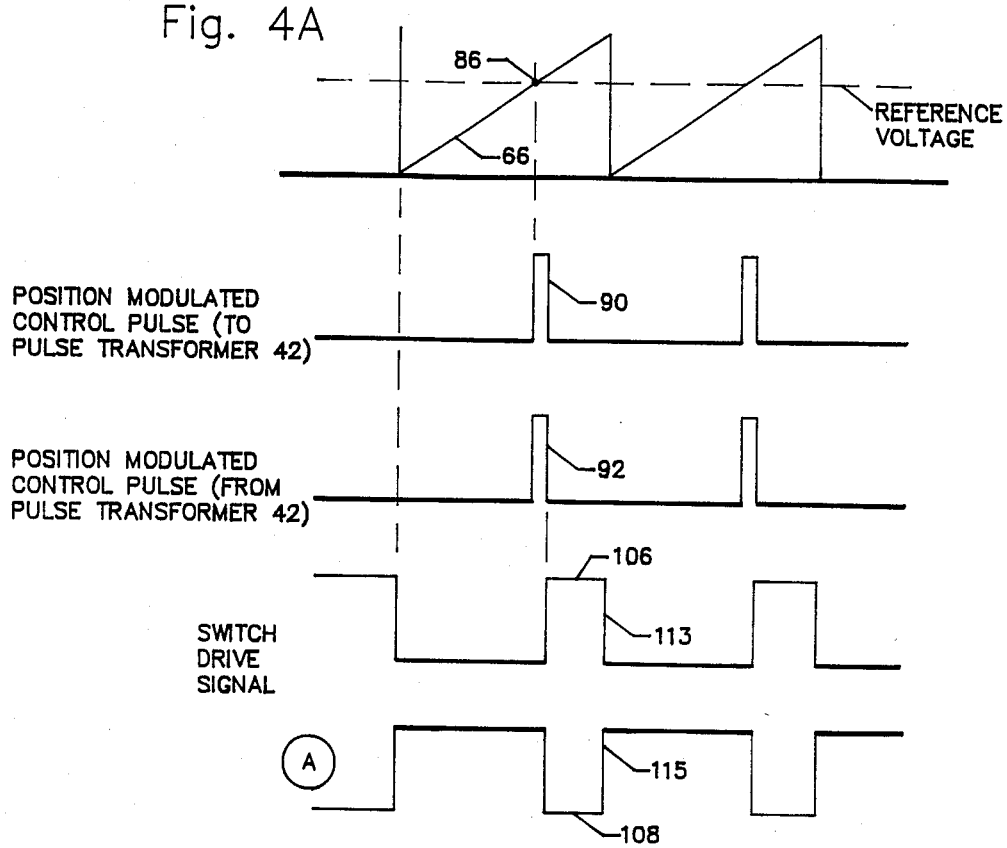
FIG. 4A is a timing diagram illustrating operation of the system of FIG. 1 for a normal output supply voltage.

A sawtooth generator circuit 64 converts the error signal from the amplifier 58 to a variable slope sawtooth waveform such as that illustrated at 66 in FIG. 4A. In the illustrated embodiment, the slope of the waveforms generated by the generator 64 vary inversely with the supply voltage of the system 10. Thus, for example, an increasing supply voltage decreases the slope of the sawtooth waveforms.

The sawtooth waveform generator 64 includes a variable current source 68 which has a control input coupled to the output 62 of the error amplifier 58. The current source 68 charges a second storage capacitor 72 so that the voltage across the capacitor 72 at output 82 ramps upward at a rate determined by the current from the current source 68. A transistor switch 74 connected across the capacitor 72 periodically shorts out the capacitor 72 to periodically reset the output 82 of the generator 64 as shown in FIG. 4A. The transistor switch 74 is driven into conduction by a one shot circuit 76 which is periodically triggered by an input signal A from an input 78 of the secondary controller circuit 32. The input 78 is coupled by a resistor 80 (FIG. 1) to the output of the secondary coil 24.

The sawtooth waveform at the output 82 of the generator 64 is compared by a comparator 84 to the reference voltage of the voltage reference circuit 60 of the secondary controller 32. When the sawtooth waveform exceeds the reference voltage (as indicated at 86 in FIG. 4A), the comparator circuit 84 triggers a one shot circuit 88 which produces the position modulated control pulse 90 of FIG. 4A. As will be more fully explained below, the position (in time) at which the pulse is generated depends upon the slope of the sawtooth waveform which as explained above, varies with changes in the supply voltage.

Referring back to FIG. 1, the control pulse 90 is outputed on the output 38 of the secondary controller 32 to the input coil 44 of the pulse transformer 42, inducing a similar position modulated control pulse 92 (FIG. 4A) in the output coil 46 of the pulse transformer 42. As shown in FIG. 4A, the pulse transformer 42 causes no significant alteration of the position in time of the position modulated control pulse.

Figure 3:
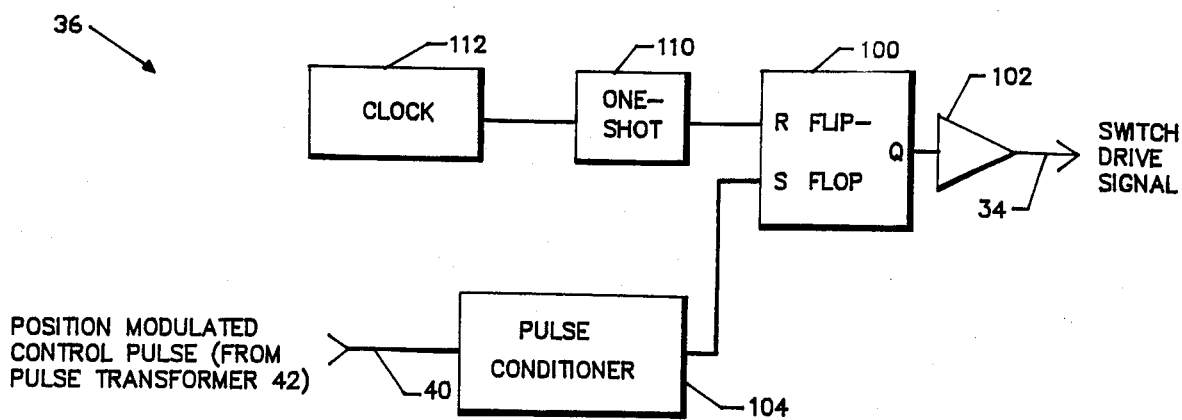
FIG. 3 is a schematic diagram of the primary controller circuit of the system of FIG. 1.

As previously mentioned, the position modulated control pulse from the secondary controller circuit 32 controls the duty cycle of the switch drive signal from the primary controller 36 to the transistor switch 26 of the primary coil circuit. Referring now to FIGS. 1 and 3, the primary controller circuit 36 of the illustrated embodiment, includes an RS-type flip-flop 100 which has a reset input R and a set input S. The Q output of the flip flop 100 is coupled by a buffer circuit 102 to the output 34 to provide the switch drive signal of the primary controller 36.

The position modulated control pulse from the secondary controller circuit 32 (via the pulse transformer 42) is conditioned by a pulse conditioner circuit 104 and sets the flip-flop 100 of the primary controller circuit 36. The setting of the flip-flop 100 produces a pulse 106 (FIG. 4A) in the switch drive signal thereby turning on the transistor switch 26 of the primary coil circuit. When the transistor switch 26 is turned on, current through the primary coil 22 induces a negative pulse 108 (FIG. 4A) in the output of the secondary coil 24 as represented by signal A.

The transistor switch 26 remains on until a pulse from a one-shot circuit 110 which is triggered by a clock pulse generator circuit 112, resets the flip-flop 100 of the primary controller circuit 36. This turns off the switch drive signal as indicated at 113 of the switch drive pulse 106 of FIG. 4A. Consequently, the secondary coil output pulse 108 is terminated as well as indicated at 115 in FIG. 4A.

The clock pulses generated by the clock generator circuit 112 are produced at a fixed frequency so that the transistor switch 26 of the primary coil circuit is always turned off at the same time in the illustrated embodiment. Thus the frequency of the switching mode power supply system 10 is set by the clock 112. However, the duty cycle of the switch drive signal and hence the turn on time of the transistor switch 26 varies with the position of the position modulated control pulse from the secondary controller 32.

Figure 4B:
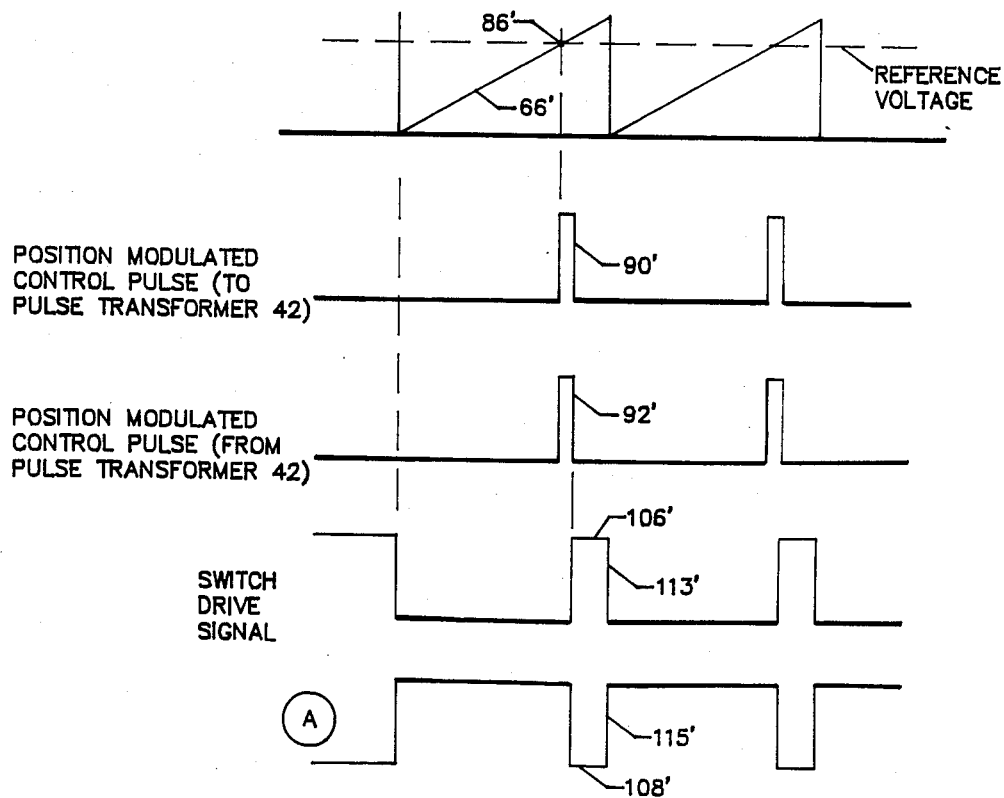
FIG. 4B is a timing diagram representing operation of the power supply system of FIG. 1 for a higher than normal output supply voltage.

As previously mentioned, the position (in time) of the position modulated control pulse depends upon the slope of the sawtooth waveform which in turn depends upon the deviation of the predetermined fraction of the supply voltage from the reference voltage. For example, FIG. 4B shows a timing diagram illustrating the operation of the system 10 for the condition in which the output supply voltage is higher than that of the supply voltage for the circuit operation illustrated in FIG. 4A. As a consequence, the current produced by the current source 68 (FIG. 2) of the secondary controller 32 is reduced so that the storage capacitor 72 charges at a slower rate. Therefore, the sawtooth waveform output of the generator 64 has a reduced slope so that it takes longer for the sawtooth waveform to reach the reference voltage. Thus, the position modulated control pulse 90' is produced later (displaced in time) as illustrated in FIG. 4B. Consequently, the switch drive signal of the primary controller 36 is turned on later reducing the duty cycle of the switch drive signal. As a result, the transistor switch 26 of the primary coil circuit is turned on for a shorter time causing a corresponding reduction in the supply voltage. The supply voltage will continue to decrease until it is restored to the level as set by the values of the resistors 50 and 52 and the reference voltage.

Thus, it is clear from the foregoing that the present invention allows analog feedback information to be transmitted across the isolation boundary in a simple yet effective manner. By generating a pulse, the position of which, varies linearly in time as a function of the applied voltage or current supplied, a simple pulse transformer can be used to transmit the pulse with little or no loss of fidelity. Furthermore, since the primary side of the transformer is controlled by varying the duty cycle signal of a switch drive signal, the feedback pulse can be used to directly determine the turn on point and no demodulation is necessary. This technique maintains the high linearity for accurate regulation and requires a relative minimum of circuitry.

It will, of course, be understood that modifications of the present invention, in its various aspects, will be apparent to those skilled in the art, some being apparent only after study and others being merely matters of routine electronic design. Other embodiments are also possible, with their specific designs dependent upon the particular applications. As such, the scope of the invention should not be limited by the particular embodiments herein described, but should be defined only by the appended claims and equivalents thereof.

We claim:

1. A power supply for providing a regulated supply voltage, said power supply comprising:
   a transformer with a primary winding and a secondary winding;
   a switching device connected to said primary winding for controlling the duty cycle of the power delivered to said primary winding;
   a primary controller coupled to said switching device for driving said switching device;
   a secondary controller coupled to said secondary winding for generating a position modulated control pulse, the timing of said control pulse being generated in accordance with any error between the supply voltage and its regulated value, said secondary controller including amplifier means for amplifying the difference between said error and a reference signal to provide a current source control signal, sawtooth generator means for generating a periodic sawtooth waveform in which the slope of the sawtooth waveform is proportional to said error and comparison means for comparing the sawtooth signal to said reference signal and providing an output signal when the sawtooth signal exceeds said reference signal, said sawtooth generator means including a storage capacitor, means for cyclically discharging the capacitor and variable current source means responsive to said current source control signal for providing current to said storage capacitor to charge said storage capacitor at a rate in accordance with the magnitude of the current source control signal; and
   a pulse transformer for coupling said position modulated control pulse from said secondary controller to said primary controller;
   whereby feedback information is transmitted from the power supply output to the power supply input across the isolation boundary of said transformer.

2. A power supply circuit comprising:
   first and second input terminals;
   first and second output terminals at which a supply voltage is provided;
   a power transformer having a primary coil and a secondary coil, one end of the primary coil being coupled to the first input terminal and one end of the secondary coil being coupled to the second output terminal;
   a transistor switch having a first terminal coupled to the other end of the primary coil, a second terminal coupled to the second input terminal, and a control signal input terminal;
   an RS-type flip-flop having a reset input, a set input and an output which is coupled to the control signal input terminal of the transistor switch;
   periodic signal generator means coupled to the reset input of the flip-flop for transmitting a periodic fixed frequency signal for periodically resetting the flip-flop;
   a storage capacitor coupled between the first and second output terminals;
   a diode coupling the other end of the secondary coil to one end of the storage capacitor and the first output terminal;
   reference voltage means having an output for providing a reference voltage;
   error amplifier means having an output, a first input coupled to the first output terminal and a second input coupled to the reference voltage means output, for providing an error signal in accordance with the difference between the supply voltage level of the power supply and the reference voltage;
   a second storage capacitor;
   variable current source means having a control signal input coupled to the output of the error amplifier means, and an output coupled to the second storage capacitor, for supplying a variable current to charge the second storage capacitor at a rate in accordance with the magnitude of the error signal of the amplifier means output;
   means for periodically discharging the second storage capacitor in synchronization with the resetting of the flip-flop;
   comparison means having an output, a first input coupled to the second storage capacitor and a second input coupled to the reference voltage means for comparing the voltage across the second storage capacitor to the reference voltage and for providing an output signal when the voltage across the second capacitor exceeds the reference voltage;
   a one-shot circuit having an output and also having an input coupled to the output of the comparison means, for providing an output pulse in response to the comparison means output signal;
   a pulse transformer having a first coil coupled to the output of the one-shot circuit and a second coil; and
   a pulse conditioner circuit coupling the pulse transformer second coil to the set input of the flip-flop for conditioning the pulses from the one-shot circuit to the set input of the flip-flop;
   wherein the pulse transformer transmits the output pulse from the one-shot circuit to the pulse conditioner circuit while maintaining isolation between the primary and secondary coils of the power transformer.

* * * * *